Feb. 24, 1959 — C. W. ESCH — 2,874,528
BEAN HARVESTER
Filed April 23, 1956 — 7 Sheets-Sheet 1

Clarence W. Esch
INVENTOR.

Feb. 24, 1959

C. W. ESCH 2,874,528

BEAN HARVESTER

Filed April 23, 1956

Clarence W. Esch
INVENTOR.

BY *Robert O Wright*

ATTORNEY

United States Patent Office 2,874,528
Patented Feb. 24, 1959

2,874,528

BEAN HARVESTER

Clarence W. Esch, Bouckville, N. Y.

Application April 23, 1956, Serial No. 580,029

17 Claims. (Cl. 56—126)

This invention relates to vegetable harvesting machines and more particularly to a machine for mechanically picking beans such as the various varieties of string beans. This application is a continuation in part of my prior application, Serial Number 451,236 filed August 20, 1954, for a Bean Harvester, now abandoned.

Heretofore various bean harvesting machines have been tried including a machine such as shown in my prior Patent Number 2,466,089 and while such machines have been useful in certain applications they have been limited in types of beans that can be picked efficiently and in the quality of results. Generally these machines have comprised a raking or combing mechanism that strips the bean plant of both leaves and beans. These have taken the form of rotary rakes or of a linear rake moved in an oval oscillatory manner. Various difficulties have been encountered with these prior machines including the fact that all the leaves and beans are stripped from the plants at any one picking; in sandy soil the severe stripping action of the tines pulls the plants from the ground; and the leaves as they are picked are generally shredded as are some of the beans producing a lot of juice which wets the beans and machinery and makes for a difficult handling situation. Further the sharp picking tines of the prior art tend to bruise the bean and form small depressions or pockets which are extremely sensitive to bacteria action. Furthermore the machines such as the above have been limited to certain definite types of beans that are more readily susceptible to mechanical picking.

According to the present invention I have provided an entirely new principle of picking beans whereby all types of beans even the so-called runner types can be picked without appreciable damage to the beans themselves and with substantially no leaves being picked. In addition, the few leaves that may be picked are not broken or crushed so that the beans are obtained in a dry condition that greatly facilitates handling. According to the present invention I provide a double spiral action that carefully picks up the bean plants, bunches them for the picking operation and gently removes the beans by applying a force to the hook or stem to separate the bean from the vine where the hook joins the plant allowing the beans to then fall freely on to a conveyor which removes them to a central assembly plant.

Accordingly, it is an object of the present invention to provide a bean harvesting machine that will pick the bean without damaging the bean plants. It is another object of the present invention to provide a bean picking mechanism that will remove substantially all the beans while removing a minimum of the leaves of the bean plants. It is another object of the present invention to provide a universal bean picking machine that will pick and handle all varieties of string beans. It is another object of the present invention to provide a bean picking machine that will not damage the leaves of the plants. It is another object of the present invention to provide a bean picking mechanism that will remove the beans from the vines without forming any depressions or bruises readily subject to bacteria damage. It is another object of the present invention to provide a bean picking mechanism that will selectively pick only beans of a desired maturity and size without damaging the remaining beans or plant. It is another object of the present invention to provide a bean picking machine that will not pull the plants from the soil while picking the beans even in sandy or loose soil conditions. It is a further object of the present invention to provide a bean harvesting machine that handles the bean plants and presents them for proper picking in a superior manner to anything heretofore known. It is another object of the present invention to provide an improved and simplified machine that is more economical to manufacture. It is a still further object of the present invention to provide a bean harvesting machine that removes the bean plants from the soil, prepares them for removal of the beans themselves and presents them to the bean picking apparatus in an improved and superior manner whereby a greater percentage of the beans are picked in a good dry condition. It is a still further object of the present invention to provide a bean harvesting machine that presents the picked beans in a condition ready for further operation without the necessity of excessive washing or other cleaning operations to remove particles of leaves, stones, sticks and other debris therefrom. These and other and further objects will be in part apparent and in part pointed out as the specification proceeds.

Figure 1:
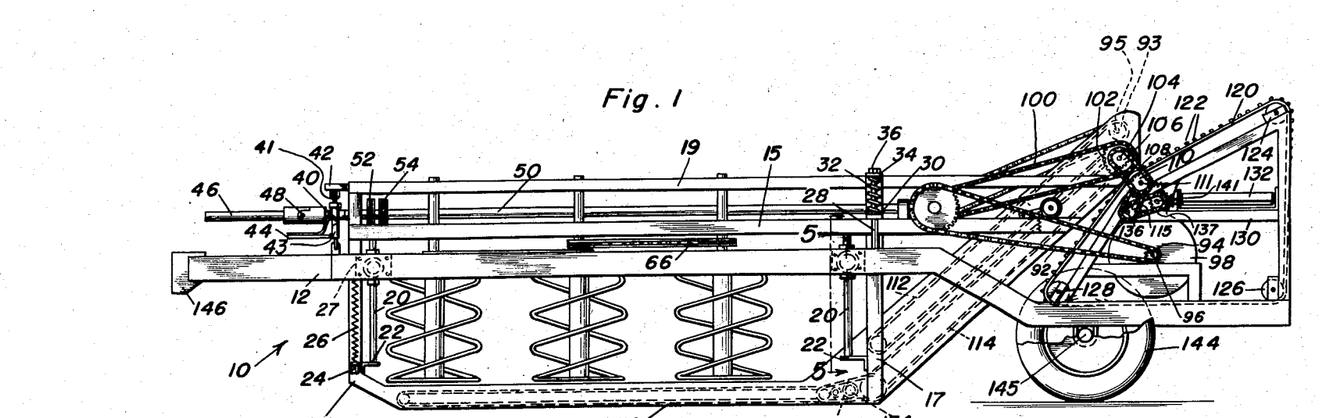
Figure 1 is a side elevation partially broken away of a machine according to the present invention.
Figure 2:
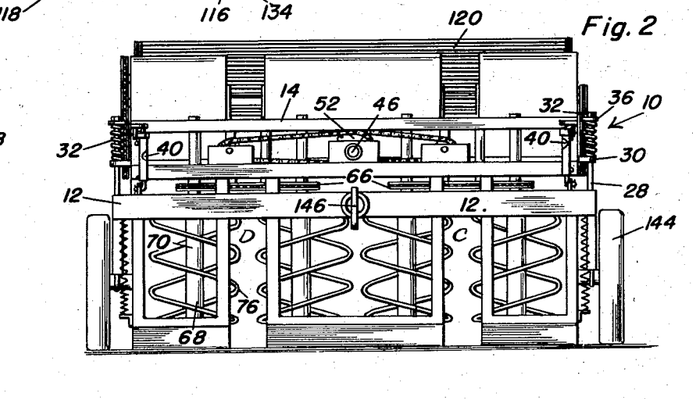
Figure 2 is an end view of the machine of Figure 1.

Referring now to Figures 1 and 2 the bean harvester generally designated by 10 and comprising the present invention includes a main frame 12 which has a composite sub-frame 14 resiliently mounted inwardly thereof in a novel manner.

Figures 4, 5:
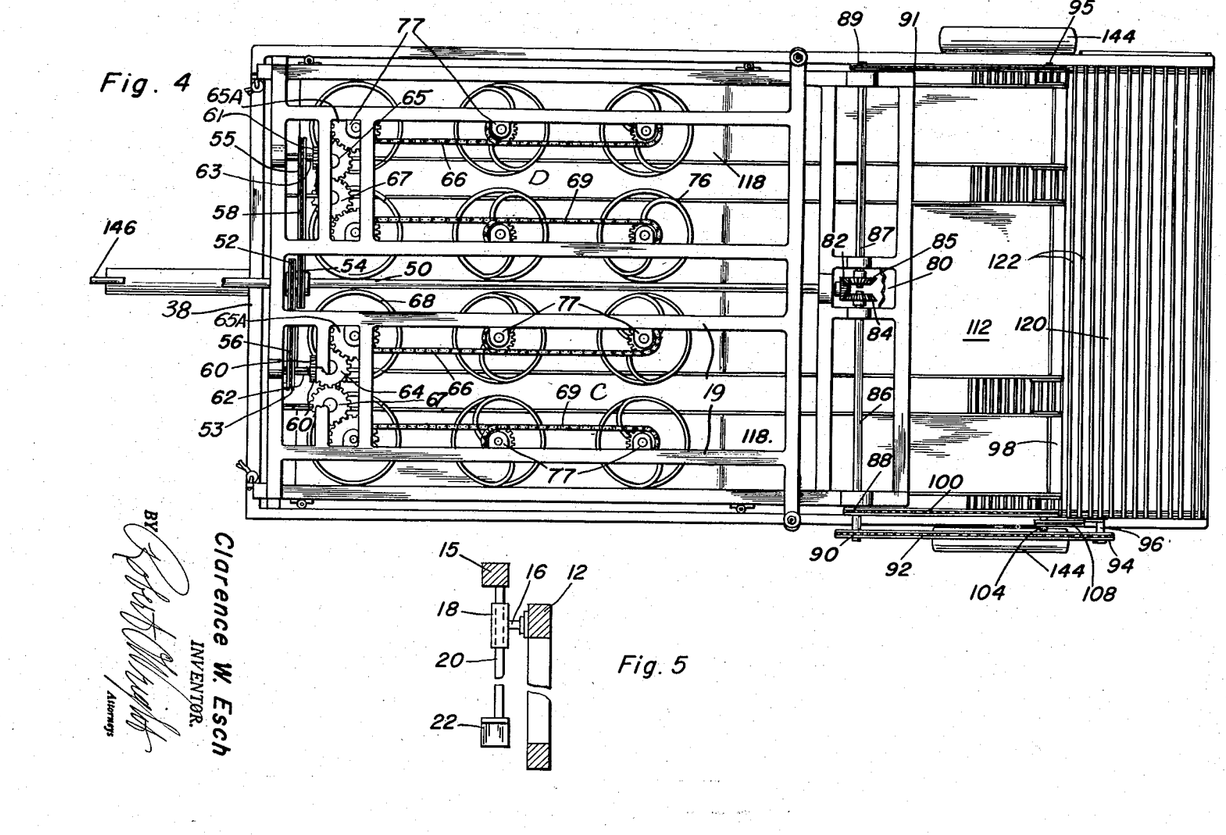
Figure 4 is a top plan view again partially broken away of the machine of Figure 1.
Figure 5 is an enlarged vertical section view taken on line 5—5 of Figure 1.

As shown in Figure 5 the main frame 12 has rotatably mounted thereon stub shaft 16 to which tubular supports 18 are attached. The tubular supports 18 have slidably mounted therein rods 20 which are fixed at their ends to stringers 15 of frame 14 and plates 22 mounted on uprights 17 of sub-frame 14. Carried by the sub-frame assembly 14 toward the front thereof are brackets 24 to which the lower ends of the tension springs 26 are attached. The other ends of the springs 26 are attached to the main frame 12 at 27. This forms a resilient front mounting for the sub-frame 14 relative to the main frame 12 so that the device may readily ride up and down over the irregular ground encountered in the average field.

Towards the rear of the main frame there is secured support standards 28 on which stops 30 are fixed. Coil springs 32 are concentrically disposed about the standards 28 and are resiliently engaged between the stops 30 and stops 34 extending from stringer 19 (see Figure 4) and held in place by nuts 36. The nuts 36 are threaded on the upper ends of the supports 28 and provide means for adjusting the stress of the springs 32 to form an adjustable resilient rear mounting for the sub-frame 14 relative to the main frame 12. Thus the sub-frame 14 may ride up and down relative to frame 12 at either the front or the rear end. Springs 32 normally counter balance the weight of the sub-frame assembly so that it lightly contacts the ground to assure the proper picking up of all bean plants and harvesting of a maximum amount of beans without excessive dragging or piling up of dirt.

Mounted at the forward end of the main frame 12 on cross-stringers 38 are a pair of hydraulic jacks 40 including a piston 41 and a cylinder 43. Piston 41 is pivotally attached to brackets 42 carried by the sub-frame 14 and cylinder 43 is similarly mounted on stringer 38. This hydraulic cylinder is connected through suitable hydraulic lines 44 to the hydraulic actuating system of a tractor or the like providing means for angularly positioning the sub-frame 14 relative to the main frame 12 at the forward portion thereof when such is desired under certain field conditions.

Main frame 12 is mounted on wheels 144 by any suitable bearings 145 at the rear portion thereof. Main frame 12 carries at the front end thereof a coupling 146 for attaching the harvester to a draw bar or tow bar (not shown) of a tractor or similar vehicle so that the harvester 10 may be towed through a field by any suitable vehicle.

Connected to any suitable power means such as the power take-off of a tractor or the like is a shaft 46 which is connected as at 48 to a drive shaft 50 which has sprockets 52 and 54 mounted thereon. The sprocket wheels 52 and 54 have chains 56 and 58 entrained thereon which also are entrained about sprockets 53 and 55 (see Figures 2 and 4) which drive bevel gears 60 and 61 through shafts 62 and 63. Bevel gears 60 and 61 engage spur gears 64 and 65 which engage on one side thereof a drive gear 65A for the chain drives 66 for the upper rows (Figure 4) of spiral picking elements and on the other side idler gears 67 which in turn drive the chain drives 69 for the lower rows of spiral picking elements. The drive shaft 50 also extends rearwardly and terminates in a housing 80 wherein a beveled gear 82 on the end of shaft 50 engages beveled gears 84 and 85 secured on shafts 86 and 87 which carry at the other ends thereof sprockets 88 and 89. In addition, shaft 86 carries on its outer end sprocket 90 which has entrained thereon a chain 92 which engages a sprocket 94 mounted on a shaft 96 for driving a fan or blower 98 as will be described herein.

Sprocket 88 is connected by chain 100 to sprocket wheel 102 mounted on a shaft 104 which drives the lower conveyor belt 114. Also mounted on the outer end of shaft 104 is a sprocket wheel 106 which carries thereon an endless chain 108 which engages sprocket wheel 110 mounted on shaft 111 for driving screen rack 120.

Upper conveyor belt 112 is driven from shaft 87 through sprocket 89 by a chain 91 entrained about sprocket wheel 93 fixed to shaft 95. Conveyor belts 114 and 112 together act as an elevating conveyor for transferring beans, which have been picked, from bottom conveyors 116 and 118 (which are positioned beneath the rows of picker elements 68) to the screen rack 120.

Also mounted about shaft 111 is a sprocket 113 which carries thereabout a chain 115 to drive the delivery conveyor 132 through an idler gear 136, chain 137 and gear 139 on shaft 141 which has fixed on the other end a beveled gear 143 which meshes with a second beveled gear 145 mounted on the delivery conveyor drive shaft. Bottom conveyor belts 118 and 116 are driven through chain 134 from conveyor belt 114 as may be seen in Figure 1. Conveyor belts 118 being disposed under the picker elements form receptacles for the picked beans as they fall through the loops of the picker elements.

Referring now to Figures 1 through 4 the picker elements 68 are arranged in four rows of three elements each within sub-frame assembly 14 so as to form two paths or picking zones C and D through which the bean plants may be passed to remove the beans therefrom. Each individual picking element 68 is mounted on a shaft 72 in bearings or pillow blocks 77 and 79 (not shown) which are fixed on stringers 19 and 15, respectively of sub-frame 14.

Figure 3:
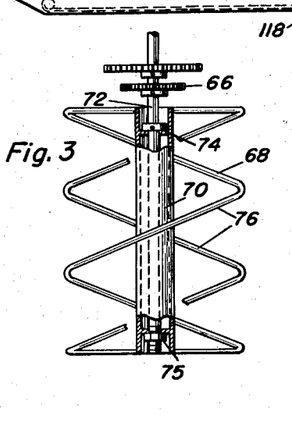
Figure 3 is an enlarged detailed view partially broken away of one of the picking elements of the device of Figure 1.

As may be seen in Figure 3 the individual picker element 68 comprises a central shaft 72 which is rotated by chains 66 or 69 as the case may be. Each of the picker elements includes a cylindrical drum 70 mounted about shaft 72 and held in place by collar 74 fixed to shaft 72 and nut 75 threaded on to the bottom end of shaft 72. The spiral or helical loops 76 are fixed to the drums 70 at each end thereof and have the major portions thereof spaced from drum 70. In assembling the machine the nut 75 is tightened so that the spirals will rotate and pick the beans under normal operation but if they should encounter a large stone or similar obstruction they will slide relative to shaft 72 and thus prevent damage to the machine. Each of the picker elements 68 are similarly constructed and mounted on sub-frame 14 for rotation by chain drives 66 and 69 in adjacent counter rotation directions such that the bean plants encountered in each picking zone are fed together toward the center and bunched for proper picking.

Figures 6, 7:
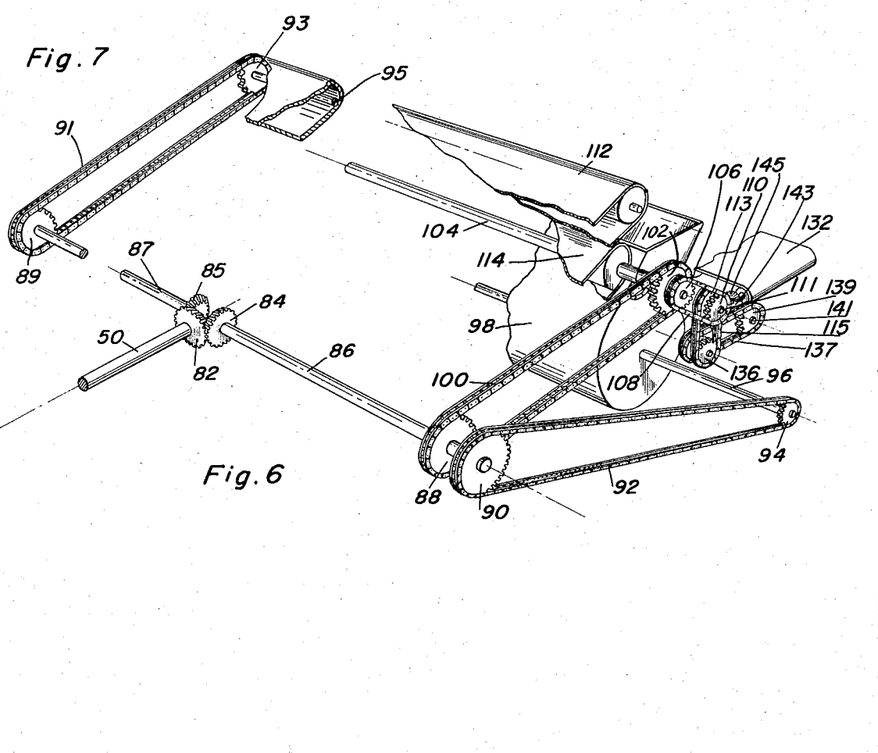
Figure 6 is an enlarged perspective view with parts broken away showing the drive mechanism for the various conveyor belts for handling the beans after they have been picked.
Figure 7 is a perspective view of a picker element according to the present invention illustrating the manner in which the beans are picked.

There is thus provided a suitable mechanism for driving the spiral picker elements and for driving the associated conveyor means such that as the device is moved along a field of string beans the bean plants are picked up and bunched together between the first pair of picker elements in each row. As the machine moves forward along a row and the picker elements rotate each spiral will move into a bean plant from underneath and catch over each loop the extremities of the plant including the leaves and beans. The leaves being flat and very light merely ride up the spiral as it rotates and are flipped over the top but the larger sized beans because of their weight fall over the spiral loop and remain substantially in a vertical position on the inside thereof. As the loop approaches the upper end of its vertical travel (Figure 7) the so called "hook" B at the top of the bean A where it is attached to the bean plant is engaged by the spiral and between the weight of the bean and the pull of the plant in the ground is detached therefrom. The picked bean then falls down on to the conveyor 118 which acts as a receptacle to gather and transport the beans toward the rear of the machine where they are picked up between conveyors 114 and 112 passed over blower 98 on to screen rack 120 where they drop through on to delivery conveyor 132.

Screening rack 120 is mounted on the main frame assembly and consists of an endless series of spaced slats 122 connected at the end thereof for passage over spaced rollers 124, 126 and 128 which are adjustably held in place on the main frame 12. The slats 122 are spaced apart sufficiently so that the good beans will drop therethrough as they are travelled upwardly therealong on to the delivery conveyor 132 which extends transversely of the main frame 12 underneath the screening rack 120. The beans are fed along delivery conveyor 132 to a discharge or bagging zone E where a chute (not shown) feeds the beans into suitable bags, baskets or similar containers (not shown).

In operation I have found that the first pair of picker elements 68 perform a largely gathering operation, that is they tend to pick up the plants from the ground and bunch them together ready for operation by the second pair of picking elements. The second pair of picking elements do a large share of the actual picking of the beans from the plants and the third pair do the balance although the first pair will pick some beans. In operation the speed of rotation of the picker elements 68 is adjusted relative to the size of bean it is desired to pick, the forward speed of the picker and to the particular field conditions encountered such as the weed content, the type of bean being picked, the state of health of the plants, i. e., whether they are stunted through drought or full bushy plants and to any other conditions that may be encountered so that a maximum picking may be obtained.

After the beans have been lifted by the conveyors 112 and 114 to the screen rack 120 the blower 98 will blow away any chaff, leaves and the like while the beans fall through the spaced slats 122 and on to the conveyor 132 in a spaced relationship to thereby enable the delivery conveyor 132 to deliver the beans to a bag or vehicle (not shown) being drawn alongside the bean harvester.

Figure 8:
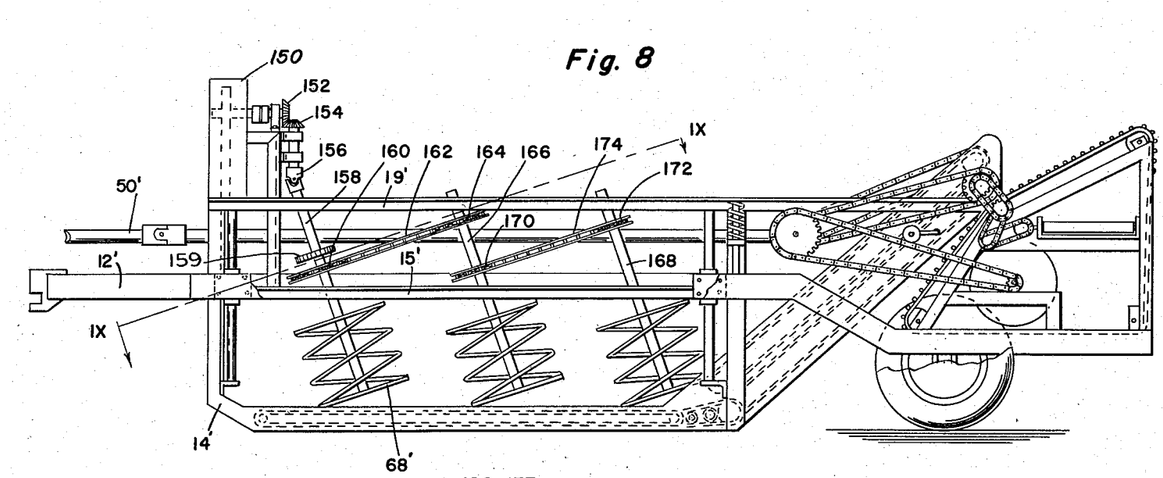
Figure 8 is a view similar to Figure 1 of another embodiment of the present invention.
Figure 9:
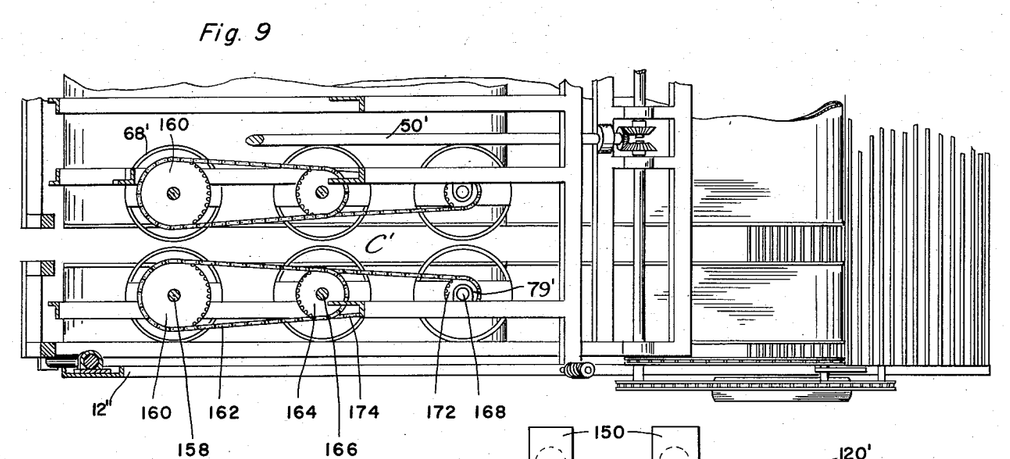
Figure 9 is a view taken on line IX—IX of Figure 8.
Figure 9A:
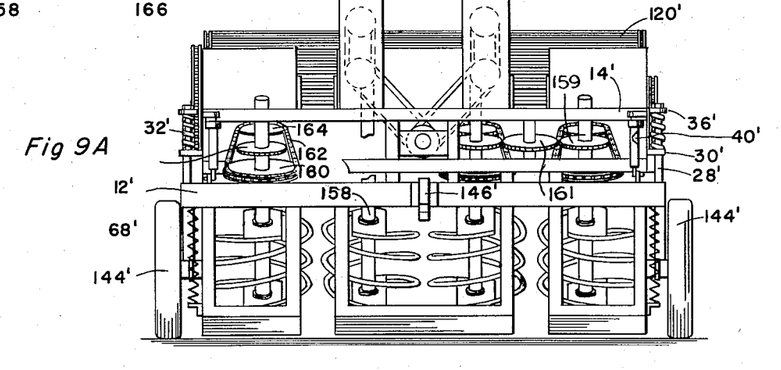
Figure 9A is a front view similar to Figure 2 of the embodiment of Figure 8.
Figure 10:
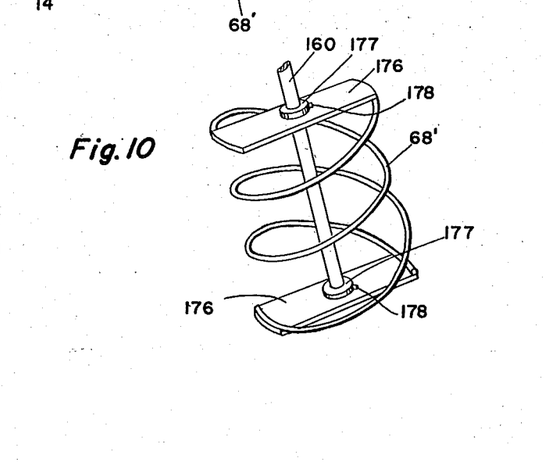
Figure 10 is a perspective view of another embodiment of a picker element.

While I have shown the foregoing bean harvester machine as being drawn by a tractor and powered therefrom it is within the scope of my present invention to provide a self-powered wheeled unit in which the various drives are provided from a main power source or several separate power sources. Referring now to Figures 8 through 10 there is shown another embodiment of the present invention having certain additional features. The embodiment shown in Figures 8 through 10 has substantially the same frame members as the preceding embodiment and the conveyor belts, screen rack and delivery conveyor together with the associated drive equipment is essentially the same and is not shown in detail again for the sake of clarity and convenience.

As may be readily seen in Figure 8 one of the obvious differences is that the picker elements 68' are slanted toward the front of the picking machine at an angle from 10 to 15 degrees. Generally speaking an angle of 10 degrees has been satisfactory although this may vary somewhat to compensate for varying speeds of rotation and ground speed of the picking machine to meet certain particular local growing conditions.

Under certain conditions it has been found desirable to have the actual picking force exerted upon the beans to be a vertical, or even in some cases, a slightly forward pull. Since the picking machine was moving along the fields and the picker elements were in effect moving upwardly of the bean plants, the resultant picking force in the foregoing embodiment was a force upwardly and somewhat to the rear of the axis of the picker element 68. In the present emobdiment of Figure 8 the upward picking force exerted by the picker element 68' is directed forwardly in the direction of movement of the picking machine relative to the bean plant so that the resultant of the two relative motions is substantially a vertical picking force such that as far as the bean plants can tell a direct vertical force only is being applied to the beans. This, it has been found helps to pick more beans in a more nearly perfect fashion and does not tend to throw the plants toward the rear of the machine as it moves along. This also under certain conditions permits faster ground speeds relative to the plants.

Another feature perhaps not quite so obvious is that of Figure 9 wherein it may be seen that the various pairs of picker elements 68' are driven at different speeds. Figure 9 shows one path or picking zone C' only of the machine and it is understood that the machine may have as many zones as desired. As shown in Figure 8 the first pair of picker elements are driven through a speed control means 150, bevel gears 152 and 154 and universal joint 156. Speed control means 150 may be of any conventional type and is not shown in detail in the interest of simplicity. Shafts 158 of the first pair of picker elements have mounted thereon spur gears 160 which have entrained thereabout endless chains 162 which engage gears 164 mounted on the shafts 166 of the second pair of picker elements. Shafts 158 also carry thereon gears 159 which engage idler gear 161 as may be seen in Figure 9A. Gears 164 are smaller than gears 160 so that the second pair of picker elements rotate at approximately a one third faster speed than the first pair. In like manner shafts 166 drive shafts 168 of the third pair of picker elements through gears 170 and 172 and chains 174, at approximately a one third faster speed than the second pair of picking elements.

As may be clearly seen in Figures 8 and 9, shafts 158, 166 and 168 are mounted at an angle in appropriate bearings or pillow blocks 77' and 79' (not shown) fixed to the stringers 15' and 19' of the sub-frame portion 14'. This permits simple direct drive of the pairs of picker elements one from the other with the necessary of only one universal joint 156.

It has been found that by progressively increasing the speeds of the picker elements the functions set forth in connection with the first embodiment are enhanced; namely, the first pair of picker elements which are the slowest rotating tend largely to pick up the bean plants, bunch them together and properly present them for picking of the beans themselves, the second pair of picker elements rotating at approximately one third faster speed pick the bulk of the beans from the bunched bean plants, and the third pair of picker elements rotating at a still faster speed in effect tend to clean up the vines picking off the smaller beans and any others that may have been missed by the first two pairs. This variable speed picking, it has been found, provides a marked improvement in the percentage of beans picked and in the quality of the beans delivered. The exact speed at which the various picker elements operate relative to the forward speed of the picking machine itself can be controlled to a certain extent through variable speed control means 150. Also, if desired the gears on the shaft 158, 166 and 168 may be changed to obtain various relative speeds of operation of the picker elements themselves.

Thus, for instance, if the field conditions are such that there are an exceptionally large number of beans per plant the forward speed of the picking machine would be slowed down and/or the rotary speed of the picker elements increased. Conversely, if the harvest is sparse the relative ground speed of the machine would be increased and the picking speed of the picker elements decreased somewhat. There is thus provided a greater flexibility to meet the various field conditions and thereby pick the beans in any given field at a maximum efficiency.

Referring now to Figure 10 there is shown a safety protector feature that lengthens the life of the machine and particularly the picker elements therein. Since the picking machine itself contacts the ground and moves along the rows of bean plants there is a tendency from time to time for a large rock to be picked up which will jam the operation of the picker elements. As described supra the picker elements would stop rotating but even so it has been found that sometimes with the unsupported loops a large rock will damage them. Accordingly, I have found that if a flat plate or partial disc 176 is fixed to the top and bottom of the picking loops it strengthens them and prevents damage by rocks and other debris. The plates 176 are then simply clamped by collars 177, fixed thereto to the respective shafts by tightening screws 178 to also provide a simplified mounting of the picker elements. In addition these plates help to collect and direct the picked beans to the underlying conveyor belts.

Referring now to Figures 11 through 15 there is shown a still further embodiment of the present invention. Under certain field conditions it has been found that a still further embodiment is advantageous. This is so particularly where there are exceptionally rocky soil conditions, where there are wide variations in the spacing of the rows of beans to be picked and/or where the soil is exceptionally loose and sandy and so on.

Figures 11, 17:
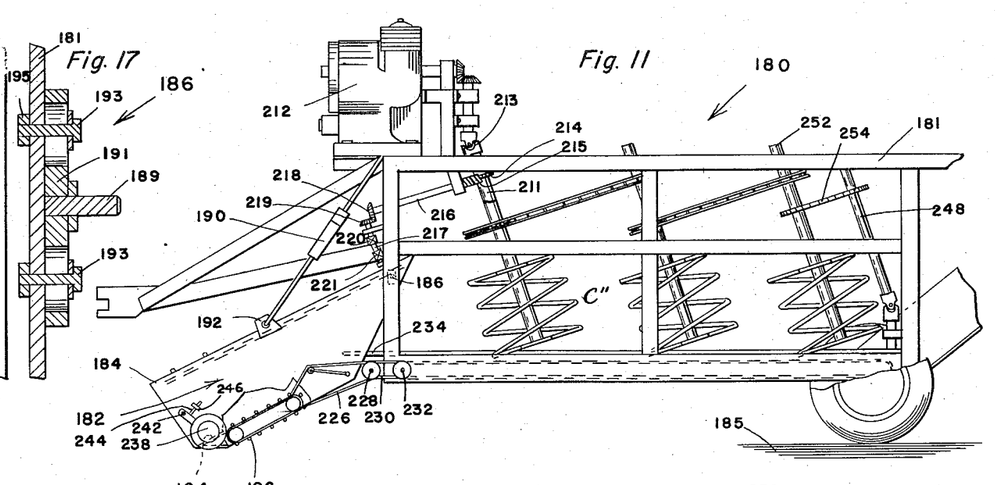
Figure 11 is a view similar to Figure 1 of a still further embodiment of the present invention.
Figure 17 is a sectional view taken on line XVII—XVII of Figure 16.
Figure 12:
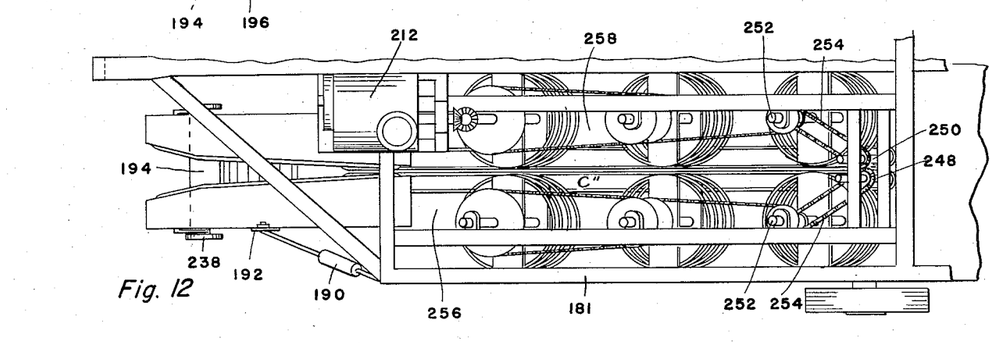
Figure 12 is a partial top plan view of the device of Figure 11.

In the embodiment shown in Figure 11, I have provided a machine for use under such conditions. This machine differs from the foregoing machines in that it digs or shovels up the bean vines entirely and transports them to a zone of picking operation conveniently removed from the soil so that soil conditions will not affect the operation of the picker elements of the machine in the picking zone and the efficiency of the picking operation will not depend upon the conditions in the field.

In Figure 11 the bean picking machine 180 generally comprises a frame structure 181, a delivery conveyor mechanism (not shown) and one or more picking zones C" essentially similar to those of the foregoing embodiments with the addition of a special digging mechanism 182 which will be described in detail herein. In addition a separate engine 212 is provided to give independent operation of the picker elements and conveyor mechanisms. The principal difference which is evident in Figure 11 is that the picker elements and frame portion of the picking machine are raised substantially from the ground level 185 so that the only portions in contact therewith are the wheels and the digging mechanism 182.

Figures 13, 14, 15:
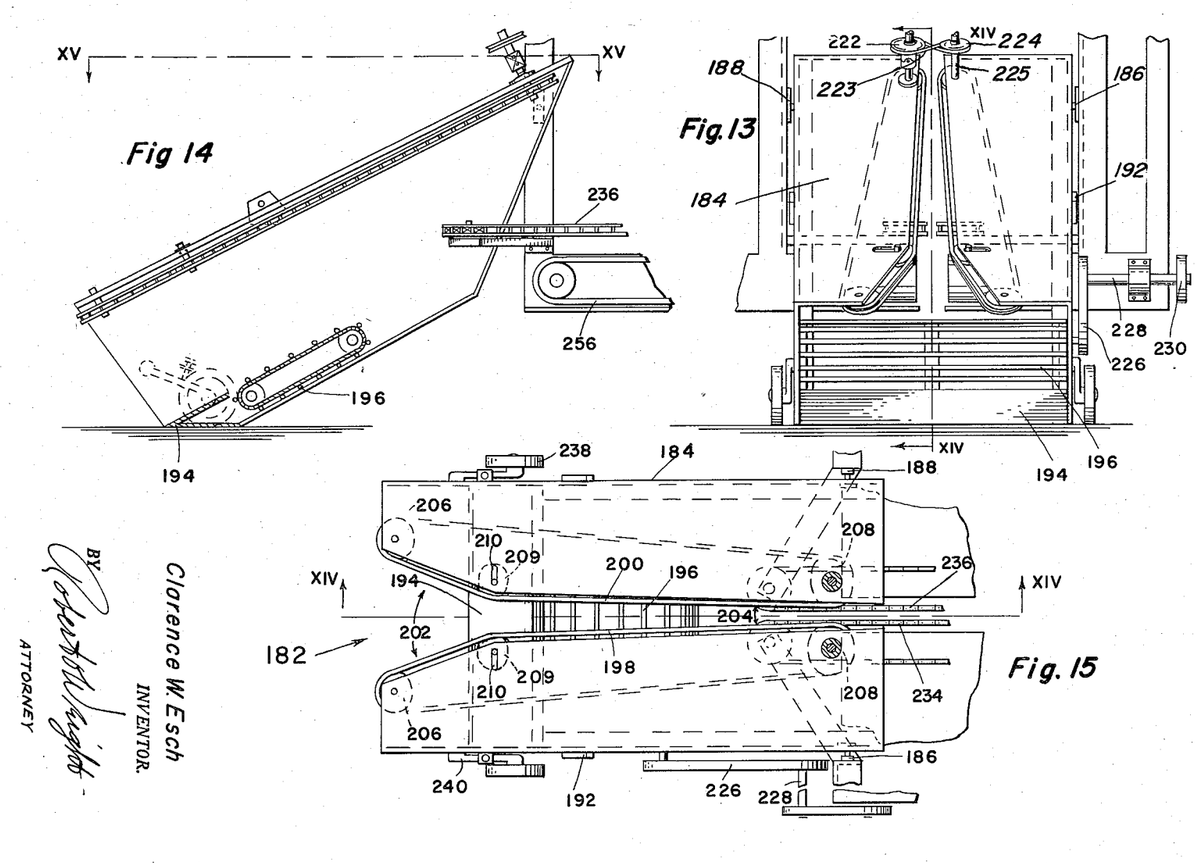
Figure 13 is an enlarged front view of the digger mechanism of the embodiment of Figure 11.
Figure 14 is a view taken on line XIV—XIV of Figure 13.
Figure 15 is a top plan view of the digger mechanism of Figure 14.
Figure 16:
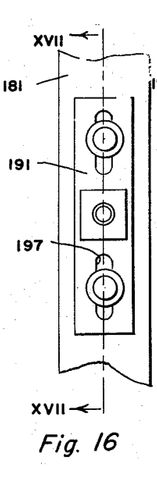
Figure 16 is an enlarged detail of the pivot mounting for the digger mechanism of Figure 11.

Referring now to Figures 13–15 the digging mechanism 182 comprises generally an outer box frame 184 adjustably mounted in the frame portion 181 of the machine 180 at 186 and 188 and angularly adjusted relative to the frame through a hydraulic coupling link 190 (see Figures 11 and 12) which connects between the upper portion of the frame 181 and the pivot bushings 192 mounted approximately at the midpoint of frame 184 of the digger 182. Adjustable mountings 186 and 188 provide both pivotal and vertical movement for the upper end of frame 184 as may be seen in Figures 16 and 17. Pivot pins 189 which are adapted to extend into corresponding bearings in frame 184 are mounted in plates 191 which in turn are adjustably fixed to frame 181 by bolts 193. Bolts 193 can be threaded in frame 181 or carry nuts 195 thereon and extend through elongated slots 197 in plates 191. Thus digger 182 may be vertically adjusted relative to the ground and the picking zone while maintaining a free pivoting action.

Positioned in the lower front end of the digger 182 is a digging blade 194 which has a sharp pointed edge adapted to easily move beneath the earth and to dig up the bean vines as the machine travels down a row thereof. Positioned directly behind digger blade 194 on the lower surface of the box frame 184 is a screen rack 196 which is adapted to receive thereon the stones and dirt dug up with the roots of the bean vine. This screen rack is an endless conveyor belt type having the transverse rods thereof spaced apart sufficiently so that the dirt falls therebetween back into the bean row together with any small stones. The larger stones are carried rearwardly up and over the screen rack 196 and dumped out back into the bean rows through the open rear bottom of the box frame 184. Thus it is readily seen that none of the dirt or rocks from the field can get past the digger mechanism 182 up into the bean picking elements.

Near the top edge of the digger mechanism 182 are a pair of endless rubber belts 198 and 200 mounted so as to engage the upper portion of the bean plants. As may be clearly seen in Figure 15 these belts gradually converge from the open front end 202 to the closed end 204. The belts 198 and 200 travel about pulleys 206 and 208 which are mounted at the respective ends of the top of frame 184. Suitable idler wheels 209 are adjustably mounted in slots 210 to maintain the desired tension on the belts 198 and 200.

The belts are driven by the engine 212 through a universal joint 213 which drives the first picker element shaft 211. A planetary gear 214 mounted on shaft 211 drives a worm gear 215 on shaft 216 which in turn drives shaft 217 through bevel gears 218 and 219. Shaft 217 drives the upper pulley 208 (Figure 15) and belt 200 through universal joints 220 and 221. Mounted on the shaft 217 is pulley 222 (Figure 13) which in turn engages through belt 223, pulley 224 on shaft 225 of the lower pulley 208 which in turn drives the other belt 198. Shafting may incorporate a suitable telescoping section to compensate for any pivotal movement of frame 184. The screen rack 196 is driven through a belt 226 from shaft 228 which in turn is driven by belt 230 from the lower conveyor belt shaft 232 as may be seen in Figures 11 and 15.

The depth of operation of the digger mechanism 182 is determined by the adjustment of ground wheels 238. Wheels 238 are mounted on offset arms 240 on one end, closely adjacent the front end of box frame 184. Arms 240 are pivotally mounted at the other end 242 in frame 184. An adjusting screw 244 is threaded in bracket 246 which is mounted adjacent end 242 of arm 240. By pivoting arm 240 clockwise the digger blade 194 is brought closer to the surface and vice versa. After the bean vines are loosened by the digger 182 they are gathered in and picked up by the conveyor belts 198 and 200. It will be readily seen in Figure 14 that once the plants are engaged by the belts they will be lifted out of the loosened soil and carried rearwardly and upwardly toward a picking zone C". After the bean plants have been bunched together and picked up by the belts 198 and 200 they pass along into the machine and are picked up by a second pair of rubber belts 234 and 236 mounted very closely adjacent the bottom of the frame portion of the picking machine 180. This second pair of belts 234 and 236 grip the bean vines quite low down on the stems close to the root system since the bean vines are raised up some ten to fourteen inches by the digger mechanism. The second conveyor belts 234 and 236 serve to hold the bean plant firmly, relative to the picker elements and to carry the bean plants through the entire picking zone and then discharge them back onto the ground at the end thereof where they may be suitably taken care of later on. The second conveyor belts 234 and 236 are driven by shafts 248 and 250 respectively which are driven from the rear picker shafts 252 by chains 254.

Since the bean plants are held at the relatively narrow stem closely adjacent the roots thereof the bottom conveyor belts 256 and 258 may be moved closer together to cover more of the bottom area of the picker machine so that there is less chance of loss of beans due to some of them falling off the conveyor. This may be clearly seen by comparing Figure 12 and Figure 4 of the prior embodiments. Furthermore, since the movement of the bean plants is controlled independently of the ground speed of machine 18 the speed of rotation of the picker elements may be adjusted relative to the transporting speed of the belts 234 and 236 to provide optimum picking conditions regardless of ground speed of the picking machine.

It should be understood that the foregoing description of Figure 11 has been of a picking mechanism for but one row and that two or more similar digging and picking mechanisms may be mounted side by side to simultaneously pick 2, 4, 6 or any number of rows of beans. Thus in operation the picking machine is moved into a field and the digger element is adjusted to the desired level, usually just below the root system of the bean vines by positioning wheels 238. As the picking machine moves through the field the digger blade 194 loosens the bean plants and they are caught up by belts 198 and 200 and carried up into the frame work of the machine. Dirt and stones are carried up the screen rack 196 and deposited back on the ground without reaching the frame work of the machine or the picking zone therein. The loosened bean plants are then engaged by the second pair of belts 234 and 236 which tightly grip the bean plants closely adjacent their roots. These belts then carry the bean plants past the picker elements which are illustratively shown as being slanted similarly to the embodiment of Figures 8 through 10. The plants are passed through a row of pairs of picker elements until al beans are removed and then they are deposited on the ground again at the back end of the picker frame. The picked beans fall through the picker element loops onto the closely spaced conveyor belts 256 and 258 and are then fed to the assembly and delivery conveyors (not shown) which may be similar to those shown in the foregoing embodiments or of any standard design.

While there is given above certain specific examples of this invention and their application in practical use, it should be understood that this is not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

I claim:

1. A bean harvesting device comprising a substantially horizontal receptacle, a support above said receptacle, said support having at least one depending bean removing element, said bean removing element comprising a rotatable helical wire having its axis of rotation substantially normal to said receptacle, said helical wire extending beyond one lateral edge portion of said receptacle, whereby when said device is moved adjacent a bean plant, the helical wire will engage the beans on said plant, detach the same and cause the same to drop on said receptacle.

2. A device as described in claim 1 further characterized by a pair of said bean removing elements mounted in said support with their longitudinal axes substantially parallel and with an interval therebetween exceeding the minimum dimensions of the produce to be harvested.

3. An assembly as defined in claim 1 further characterized by a plurality of bean removing elements assembled in tandem relation on said support to provide a linear path along which successive picking operations may be performed on the bean plant.

4. A device as described in claim 2 and means for simultaneously rotating both bean removing elements, the directions of rotation of said elements being those required for both elements to impart motion in the same direction approximately parallel to the longitudinal axes of the bean removing elements to materials passing between said bean removing elements.

5. An assembly as described in claim 4 further characterized by a plurality of pairs of resilient elongated bean removing elements mounted in tandem relationship on said support to provide a linear path between successive pairs of said plurality of bean removing elements.

6. A device as described in claim 5 wherein said means for rotating said picking elements include means for rotating said tandem pairs at progressively faster speeds to provide a bunching, picking and cleaning effect on the bean plants.

7. A bean harvesting device comprising a substantially horizontal conveyor, a support above said conveyor, said support having at least one depending bean removing element, said bean removing element comprising a rotatable helical wire rod member having its axis of rotation substantially normal to said conveyor, said helical wire member extending beyond one lateral edge portion of said conveyor, said helical wire member being slightly inclined at an angle of approximately ten degrees in the intended direction of movement of said device through a field of bean plants, whereby when said device is moved adjacent to a bean plant the helical wire will engage the beans on said plant, detach the same and cause the same to drop on said conveyor.

8. A device as described in claim 7 further characterized by at least one pair of bean removing elements having their longitudinal axes substantially parallel and being spaced apart a distance substantially less than the average width of the plants on which the beans grow, and means for simultaneously rotating both bean removing elements, each element being rotated in the direction which for a predetermined direction of motion of said device will impart an upward impetus to materials passing between said members and impinging thereon when said device is moved to pass a plant between said bean removing elements whereby the branches of the plant will be lifted and the mature produce growing on said branches will be stripped from the plant without crushing or injuring the produce or the plant or removing branches, leaves or immature beans from the plant.

9. A device as described in claim 7 further characterized by a plurality of pairs of picking elements disposed in tandem relation to said support and said rotating means for driving each pair of loops at a rotating speed different from the others.

10. A harvesting device for harvesting beans and the like produce comprising a substantially horizontal support member, said support having at least one depending bean and the like removing element, said element comprising a rotatable helical wire having its axis of rotation substantially vertical, said helical wire extending beyond one lateral edge portion of said support, whereby when said device is moved adjacent to a bean and the like produce plant the helical wire will engage the beans and like produce on said plant and detach the same.

11. A device as described in claim 10 further characterized by a pair of bean and the like produce removing elements mounted in said support with their longitudinal axes substantially parallel and with an interval between said elements exceeding the maximum dimension of the bean and the like produce to be harvested, and means for simultaneously rotating both members, the directions of rotation of said elements being those required for both elements to impart motion in the same direction parallel to the longitudinal axes of said elements to materials passing therebetween.

12. A device for harvesting beans and like produce without damaging the host plant comprising in combination a substantially horizontal receptacle, a support above said receptacle, said support having at least one depending bean and the like removing element, said bean removing element comprising a rotatable helical wire having its axis of rotation substantially normal to said receptacle, said helical wire extending beyond one lateral edge portion of said receptacle, a digger mechanism pivotally mounted on said support comprising a digger means to uproot the bean and the like produce plants, conveyor means operatively connected between said digger means and said bean and the like removing element whereby when said device is moved adjacent a bean and the like produce plant said plants are uprooted and carried past said bean removing element to permit the helical wire to engage the beans on said plants, detach the same and cause the same to drop upon said receptacle.

13. A device as described in claim 12 further characterized by a first pair of transporting belts mounted on said support below said receptacle, said belts being spaced apart a distance less than the average diameter of the stem of the plant on which the beans grow, a digger mechanism pivotally mounted on said support in front of said picking element, said digger mechanism including a digger blade fixed on the front edge of said mechanism for loosening the plants from the soil, a second pair of belts mounted on said digger mechanism above said digger blade and extending therefrom in a converging manner to adjacent one end of said first pair of transporting belts, adjustable ground contacting members mounted on said digger mechanism and adjacent said digger blade for varying the depth of digging thereby.

14. A device for harvesting beans and like produce without damaging the host plant comprising in combination a substantially horizontal receptacle, a support above said receptacle, said support having at least one pair of bean removing elements having their longitudinal axes substantially parallel and being spaced apart a distance substantially less than the average width of the plants on which the beans grow, a digger mechanism pivotally mounted on said support in front of said bean removing elements comprising digger blade means to uproot the plants from the soil, conveyor belt means operatively connected between said digger blade means and said bean picking elements whereby when the device is moved along a row of bean and the like produce plants, the plants are uprooted, picked up and passed between said pair of picking elements in a predetermined direction.

15. A bean harvesting device comprising a substantially horizontal conveyor, a support above said conveyor, said support having a plurality of pairs of depending bean removing elements, said bean removing elements comprising a rotatable helical wire having its axis of rotation substantially normal to said conveyor, said helical wire extending beyond one lateral edge portion of said conveyor, means for simultaneously rotating both bean removing elements, said element rotating means being operative independently of the movement of said device through a field of bean and the like produce plants whereby when said device is moved along a row of bean plants the helical wires will engage the beans on said plants, detach same and cause the same to drop on said conveyors.

16. A bean harvesting device as described in claim 1 wherein said bean removing element includes a shaft member, a tubular sleeve slidably journalled on said shaft and at least one helical loop of said wire being fixed to said sleeve whereby said helical loop will slip about said shaft before breaking if jammed by any foreign object.

17. A bean harvesting device of the type set forth in claim 1 wherein said bean removing element includes a shaft member, a pair of partial plates mounted at spaced intervals on said shaft, a pair of helical loops of said wire being secured to the outer periphery of said plates and extending therebetween, a collar and a screw fixed to each of said partial plates for adjustably fixing said plates to said shaft.

References Cited in the file of this patent

UNITED STATES PATENTS

| | | |
|---|---|---|
| 309,462 | Hooper | Dec. 16, 1884 |
| 2,587,553 | Ward | Feb. 26, 1952 |